United States Patent
Soelberg et al.

(10) Patent No.: US 8,090,802 B1
(45) Date of Patent: Jan. 3, 2012

(54) SMART SUPER-DISTRIBUTION OF RIGHTS-PROTECTED DIGITAL CONTENT

(75) Inventors: Emily Lyons Soelberg, Atlanta, GA (US); Anastasios L. Kefalas, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1094 days.

(21) Appl. No.: 11/009,071

(22) Filed: Dec. 13, 2004

(51) Int. Cl.
G06F 15/16 (2006.01)
H04L 12/28 (2006.01)

(52) U.S. Cl. .......................... 709/219; 709/228; 370/351

(58) Field of Classification Search .................. None
See application file for complete search history.

(56) References Cited

U.S. PATENT DOCUMENTS

| | | | | |
|---|---|---|---|---|
| 6,317,784 | B1 * | 11/2001 | Mackintosh et al. | 709/219 |
| 6,665,521 | B1 * | 12/2003 | Gorday et al. | 455/67.11 |
| 6,738,805 | B2 * | 5/2004 | Negishi | 709/219 |
| 6,965,770 | B2 * | 11/2005 | Walsh et al. | 455/426.1 |
| 7,200,575 | B2 * | 4/2007 | Hans et al. | 705/59 |
| 7,209,900 | B2 * | 4/2007 | Hunter et al. | 705/58 |
| 7,299,271 | B2 * | 11/2007 | Sato | 709/219 |
| 7,334,022 | B2 * | 2/2008 | Nishimura et al. | 709/208 |
| 7,356,557 | B2 * | 4/2008 | Kikuchi et al. | 709/201 |
| 7,685,315 | B2 * | 3/2010 | Pessi et al. | 709/246 |
| 7,688,785 | B2 * | 3/2010 | Bachmann et al. | 370/331 |
| 2002/0013826 | A1 * | 1/2002 | Hughes et al. | 709/219 |
| 2002/0143855 | A1 * | 10/2002 | Traversat et al. | 709/202 |
| 2003/0237097 | A1 * | 12/2003 | Marshall et al. | 725/105 |
| 2004/0176080 | A1 | 9/2004 | Chakravorty et al. | |

FOREIGN PATENT DOCUMENTS

WO  WO 02/084980  10/2002

\* cited by examiner

*Primary Examiner* — Ranodhi Serrao
*Assistant Examiner* — Thomas Richardson
(74) *Attorney, Agent, or Firm* — Moazzam & Associates, LLC

(57) ABSTRACT

Disclosed is a system and method for super-distribution of rights-protected digital content. A first terminal offers digital content to a second terminal, using a unique content identifier to identify the content in the request. The second terminal requests information regarding the content from a service provider platform. The content information request includes a terminal type identifier for the second terminal. The service provider platform obtains format capabilities information for the second terminal from a terminal capabilities database, and selects a format type for the content using the format capabilities information. The service provider platform obtains a content object in the selected format type from a content storage database. The service provider platform then delivers the content object in the selected format to the second terminal.

3 Claims, 6 Drawing Sheets

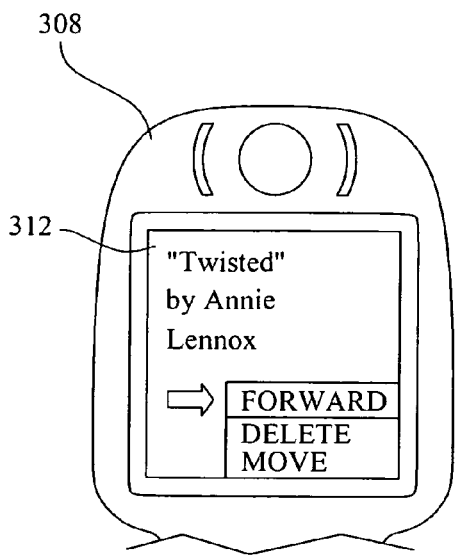
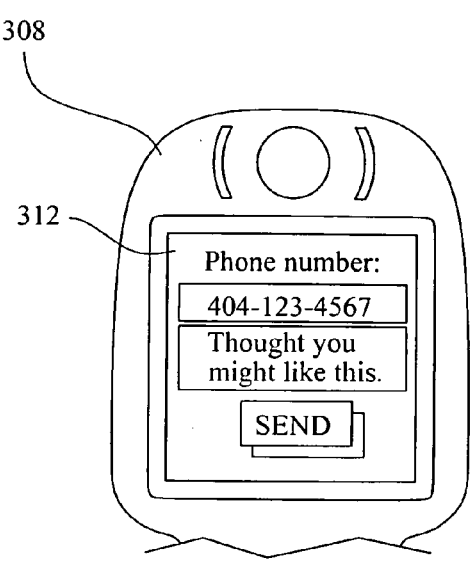
FIG. 3A        FIG. 3B
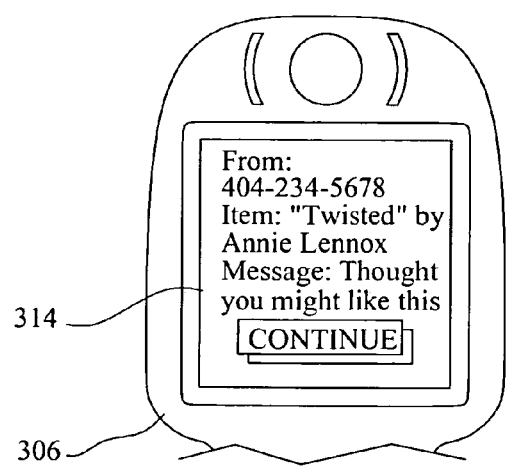
FIG. 3C

| 502 | | 504 | | | | |
|---|---|---|---|---|---|---|
| 506 | 508 | 510 | 512 | 514 | 516 | |
| DEVICE TYPE | MODEL NO. | OPERATING SYSTEM | AUDIO ENCODERS | VIDEO ENCODERS | DISPLAY SIZE | ... |
| • | • | • | • | • | • | ... |
| • | • | • | • | • | • | ... |
| • | • | • | • | | | |
| • | • | • | | | | |
| • | • | • | | | | |
| • | • | | | | | |
| • | | | | | | |

FIG. 5

| 606 | 604 | 602 | 608 |
|---|---|---|---|
| CONTENT IDENTIFIER | FORMAT TYPE | CONTENT OBJECT | COST |
| CONTENT_ID | A | CONTENT_ID, TYPE_A | COST |
| | B | CONTENT_ID, TYPE_B | |
| | C | CONTENT_ID, TYPE_C | |
| | D | | |

FIG. 6

SMART SUPER-DISTRIBUTION OF RIGHTS-PROTECTED DIGITAL CONTENT

CROSS-REFERENCE TO RELATED APPLICATIONS

None.

BACKGROUND OF THE INVENTION

A. Field of Invention

This invention relates to smart super-distribution of rights-protected digital content. More particularly, the invention relates to distribution of rights-protected digital content between communication terminals such that the receiving terminal receives the digital content in a preferred format.

B. Description of Related Art

Wireless communication technology continues to develop, fueled by user demand for ever more powerful capabilities and features. One such area of development is with digital content, such as digital audio, video, and software applications (such as games). As mobile terminals become more sophisticated with more powerful processors and larger memories, and service providers build larger and faster networks, content providers devote resources to develop more sophisticated content. As content providers invest resources in developing content to meet user demand, they also become concerned about receiving equitable compensation from the users of the content and protecting their content investments from unauthorized copying and distribution. Thus, standards for content security and digital rights management (DRM) are being developed to meet these concerns.

In one version, shown in FIG. 1 and known as the Open Mobile Alliance (OMA) Version 1.0 "separate delivery" model, a content object 102 and a rights object 104 are delivered separately to a second terminal 106. Currently, in cases where one mobile user forwards a content object to another mobile user (instead of downloading the content object directly from a site like a mobile operator storefront) the content object 102 is forwarded directly from a first terminal 108 to the second terminal 106. The user of the second terminal 106 requests the rights object 104 from the network. The content object 102 is encrypted and, thus, unusable without the rights object 104. A decryption key is delivered with the rights object 104 enabling use of the content object 102. The content object 102 can be freely forwarded between terminals. However, the rights object 104 can not be forwarded between terminals. The rights object 104 must be purchased separately in order to use the content object 102. This model allows for free copying and distribution, or "super-distribution", of the rights-protected digital content object 102 between terminals, while providing a means for charging for use of the content.

However, an issue with super-distribution is the large number of terminal types available on the market, with the terminal types having different format capabilities. For instance, smart phones, personal digital assistants (PDAs), handheld PCs with wireless communication capabilities are available from multiple manufacturers. Audio/video decoders, operating systems, display sizes, display resolutions, and color capabilities all vary between the various terminal types. A content object that is compatible with one terminal may not be compatible with the receiving terminal, or there may be a version of the content object in a different format that would work better or have additional features. Thus, there is a need for a system and method that allows super-distribution of rights-protected digital content such that the receiving terminal receives the digital content in a preferred format.

Further, users generally do not want to concern themselves with such issues as knowing the type or capabilities of their terminals, or selecting format types for content for their terminals. Thus, there is also a need for a system and method of super-distribution of rights-protected digital content that is seamless to the sender and the receiver of the content, allowing the sender and receiver to feel like the content has been forwarded directly from the sender to the receiver without regard to selection of a preferred format for the content.

SUMMARY OF THE INVENTION

The system and method of the present invention meets these needs, and others, by providing smart super-distribution of rights-protected digital content. Advantageously, when users receive digital content and rights to the content, according to the method and system of the invention, the content will be compatible with the user's terminal. Also, as a further advantage, content providers can constantly update their digital content, so that when users receive digital content they are receiving the latest versions of the content.

With the invention, the end user has the experience of being able to forward content similar to the experience under today's "separate delivery" convention, but the content object itself is not sent from one user to another. Rather, a unique content identifier is forwarded. The receiving user will have the ability to "install" the content. What they are really doing, however, is querying a centralized, network-based server for the content which will deliver it in the format that is best suited for that device.

A system for super-distribution of rights-protected digital content, according to the invention, generally has: a first terminal having a first user agent application for sending a content offer message, the content offer message having a content identifier to identify the content; a second terminal in communication with the first terminal, the second terminal having a second user agent application for receiving the content offer message from the first terminal; and a service provider platform in communication with the second terminal, the service provider platform is for: receiving a content information request for the content from the second terminal, the content information request containing a terminal type identifier for the second terminal; selecting a format type for the content using the terminal type identifier; and delivering to the second terminal: a content object in the selected format; and a rights object for the content.

According to one aspect of the system, the content offer message includes a message body from a user of the first terminal to a user of the second terminal.

According to another aspect of the system, the service provider platform is further for: obtaining format capabilities information for the second terminal using the terminal type identifier; and selecting the format type for the content using the format capabilities information. Then, the system may further include a terminal capabilities database relating terminal type identifiers with format capabilities information for terminals associated with the terminal type identifiers. The terminal capabilities database is in communication with the service provider platform. The service provider platform is further for: requesting the format capabilities information from the terminal capabilities database using the terminal type identifier; and receiving the format capabilities information for the second terminal from the terminal capabilities database.

According to yet another aspect, the system further includes a content storage database relating digital content objects with content identifiers and format types. The content storage database is in communication with the service provider platform, and the service provider platform is further for obtaining the content object in the selected format type from the content storage database using the content identifier and the selected format type. The content storage database may further relate cost amounts with the content objects, and the service provider platform may be further for: obtaining the cost amount with the content object; advising the second terminal of the cost amount for the content object; and receiving acceptance of the cost amount from the second terminal.

Generally described, a method of distribution of rights-protected digital content where the digital content is offered from a first terminal to a second terminal using a unique content identifier to identify the content, according to the invention, includes the steps of: receiving a content information request for the content from the second terminal, the content information request containing the content identifier and a terminal type identifier for the second terminal; selecting a preferred format type for the content using the terminal type identifier; and delivering to the second terminal: a content object in the selected format; and a rights object for the content.

According to one aspect of the invention, the step of selecting a format type for the content includes obtaining format capabilities information for the second terminal using the terminal type identifier, and selecting the format type for the content using the format capabilities information. Where the format capabilities information is contained in a format capabilities database, the step of obtaining format capabilities information for the second terminal includes: requesting the format capabilities information from the terminal capabilities database using the terminal type identifier; and receiving the format capabilities information for the second terminal from the terminal capabilities database.

Where the content object is stored in a content storage database, the method further includes obtaining the content object in the selected format type from the content storage database using the content identifier and the selected format type. Additionally, where the content storage database contains a cost amount for the content object, the method still further includes: obtaining a cost amount for the content object from the content storage database; advising the second terminal of the cost amount for the content object; and receiving acceptance of the cost amount from the second terminal.

The system aspect of the invention could be implemented on digital computing equipment. Further, the various method aspects of the invention may be found as executable instructions in computer software contained on a computer readable medium.

No limitations on the invention should be taken from the preceding summary, as it is merely intended to summarize the various aspects of the invention. The invention will be better understood by reference to the following detailed description and the appended drawings and claims.

BRIEF DESCRIPTION OF THE DRAWINGS

FIGS. 3A-3E show a series of terminal display screens that illustrate the user experience for users of an exemplary system and method of the invention.

FIG. 5 is a diagram of the data structure of an exemplary terminal capabilities database, as might be used with a system according to the invention.

FIG. 6 is a diagram of the data structure of a content storage database, as might be used with a system according to the invention.

DETAILED DESCRIPTION OF EXEMPLARY EMBODIMENTS

It should be noted that many of the principles of the invention described and claimed herein will apply equally to wireline and other telecommunication systems, as well as to the wireless devices and system described herein. Thus, the description of the exemplary embodiments should not be construed as a limitation on either the spirit of the scope of the claimed invention.

Figure 1:
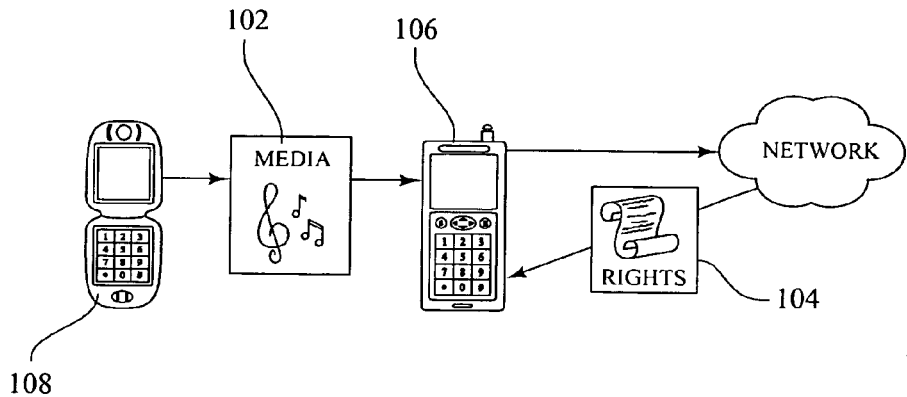
FIG. 1 is a diagram showing the prior art system and method of super-distribution of digital content.
Figure 2:
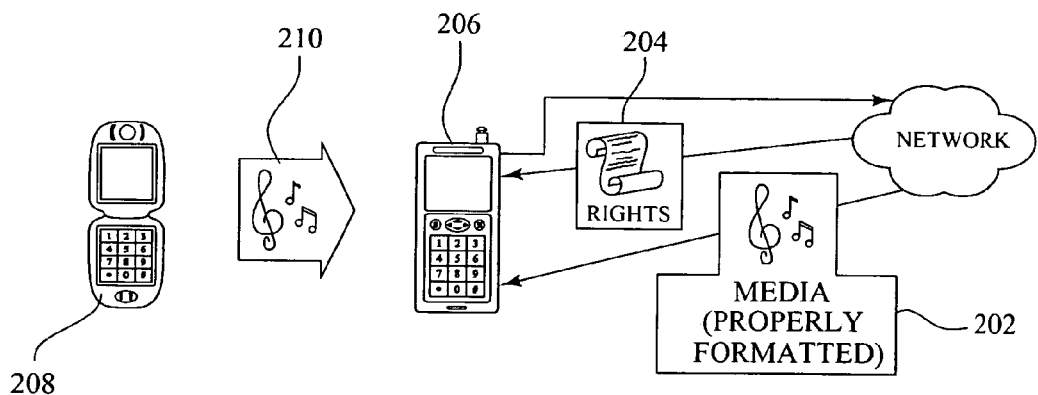
FIG. 2 is a diagram showing an overview of an exemplary system and method for super-distribution of rights-protected digital content according to the invention.

FIG. 2 shows an overview of an exemplary system and method for super-distribution of rights-protected digital content such that a second terminal 206 receives a content object 202 in a preferred format. More specifically, a first terminal 208 forwards a content identifier 210 for the content to the second terminal 206. The second terminal 206 then requests and receives a rights object 204 for the content and a properly formatted content object 202.

Figure 3D:
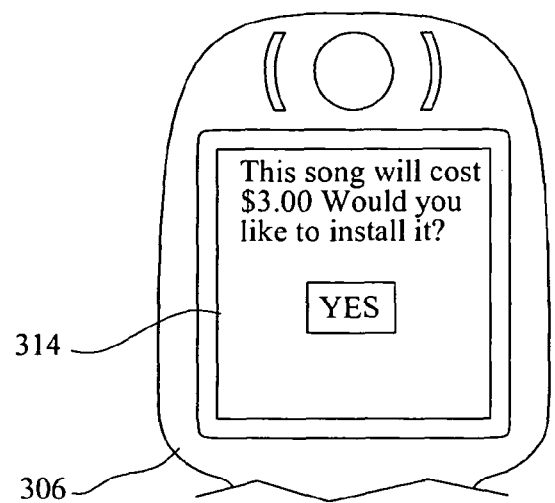
Figure 3E:
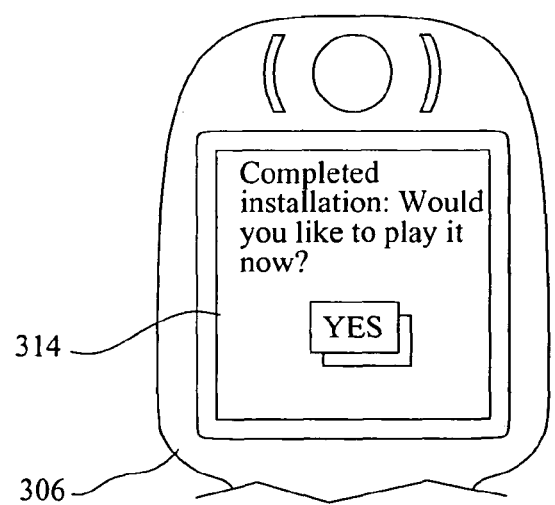

FIGS. 3A-3E show a series of terminal display screens that illustrate the user experiences for the users of the first terminal and the second terminal described above. FIG. 3A shows a display screen 312 of a first terminal 308, where the user has selected a "forward" action from a menu for a song, as an example of a piece of rights-protected digital content. FIG. 3B shows the display screen 312 of the first terminal 308, where the user has entered a telephone number of a second terminal, and has also entered a message for the user of the second terminal. Thus, it appears to the user of the first terminal 308 that they are sending the content to the second terminal. FIG. 3C shows a display screen 314 of a second terminal 306, where the message from the user of the first terminal is displayed along with a description of the digital content. FIG. 3D shows the display screen 314 of the second terminal 306, displaying an offer from the service provider to purchase the content. FIG. 3E shows the display screen 314 of the second terminal 306, indicating that the content and rights have been installed, and that the song is available to be played. Thus, it appears to the user of the second terminal 306 that they have received the content from the first terminal.

Figure 4:
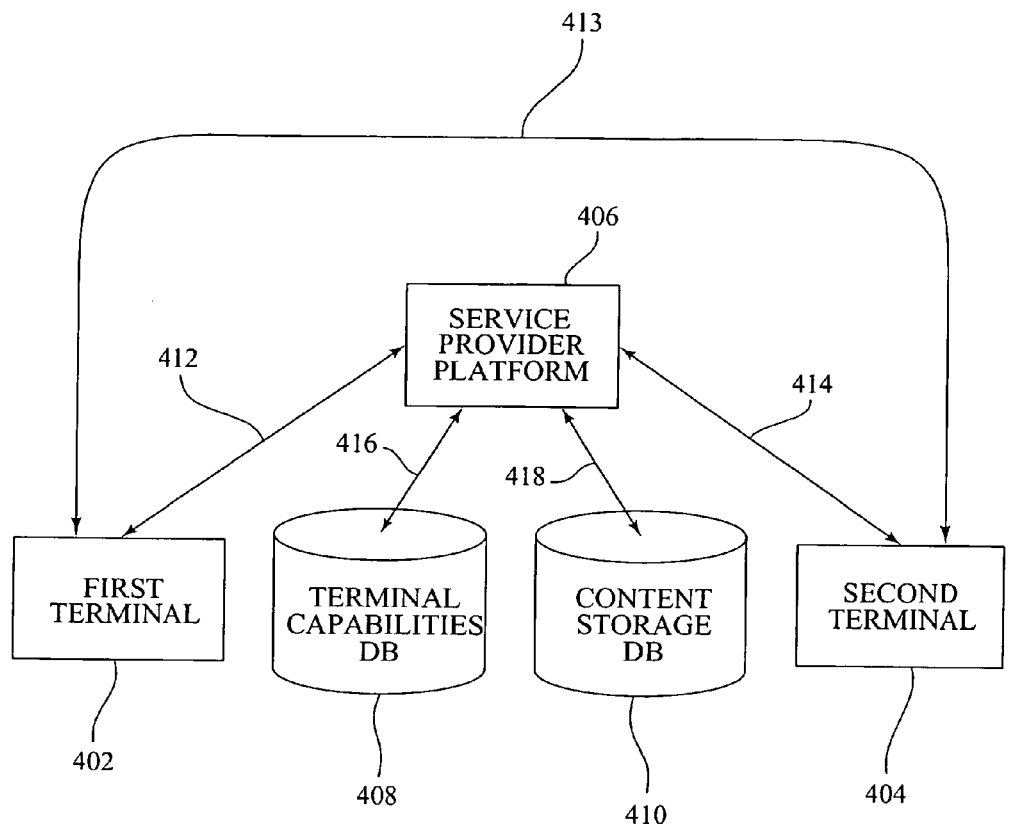
FIG. 4 is a functional block diagram of an exemplary system according to the invention.

FIG. 4 shows an exemplary system for smart super-distribution of rights-protected digital content. The exemplary system has a first terminal 402, a second terminal 404, a service provider platform 406, a terminal capabilities database 408, and a content storage database 410.

The first terminal 402 and the second terminal 404 represent a sending terminal and a receiving terminal, respectively. As mentioned, preferably they are wireless telecommunication terminals, such as smart phones, PDAs or handheld PCs, having the ability to use rights-protected digital content, such as audio, video or software application objects. Of course, an actual system would have many, many terminals, where the super-distribution concept would realize the benefits of each terminal potentially forwarding digital content to many other terminals. However, the basic principles of this exemplary embodiment of the invention can be described simply with only the first terminal 402 and the second terminal 404.

The first terminal 402 and the second terminal 404 are in communication with the service provider platform 406 and with each other. The communication links 412, 413, 414 between the terminals 402, 404 and the service provider platform 406 use one or more communication networks, such as a wireless network or a combination or wireless and wireline networks.

The first terminal 402 has a first user agent application that is operative to send a content offer message to another terminal. The content offer message is for "forwarding" a digital content object, as described above. However, the content offer message contains only a unique content identifier to identify the message rather than forwarding the entire content object. Of course, this makes the content offer message much smaller in size than it would be if it contained the entire digital content object.

The second terminal 404 has a second user agent application for receiving the content offer message from the first terminal and presenting the terminal address, or phone number, of the first terminal and a description of the offered digital content to the user of the second terminal 404. The second user agent application might also contain the functionality of the first user agent application, so that the user of the second terminal 404 can also "forward" the digital content onto other terminals. Likewise the first user agent application might also contain the functionality of the second user agent application, so that the user of the first terminal 402 can receive content offer messages from other terminals.

The service provider platform 406 is a computing platform capable of executing instructions to perform the tasks described herein, including receiving requests, delivering offers, selecting format types based on information provided, and delivering content objects. The service provider platform 406 could be a stand-alone, server-type device. Alternatively, the service provider platform 406 could be combined with other functional platforms in a more centralized computing system architecture.

FIG. 5 shows the structure of an exemplary terminal capabilities database. The exemplary terminal capabilities database according to the invention is provisioned with a list of terminal type identifiers 502 for all terminal types supported by the system, and format capabilities information 504 for each terminal type. The terminal type identifiers include, for example, information such as device type 506 and model number 508. The format capabilities information includes information such as operating system 510, audio encoder formats 512 supported by the terminal, video encoder formats 514 supported by the terminal, and display size 516. An example of a terminal capabilities database is the International Mobile Equipment Identifier (IMEI) database, as used by wireless service providers.

Returning now to FIG. 4, it is seen that the terminal capabilities database 408 is in communication with the service provider platform 406 through a service provider platform-terminal capabilities database communication link 416. Alternatively, the terminal capabilities database 408 could be integrated with the service provider platform 406 and communicate over an internal bus or equivalent data communication structure.

FIG. 6 shows the structure of an exemplary content storage database. The exemplary content storage database is provisioned with content objects 602 which have been pre-adapted for various format types compatible with the supported terminal types. The content objects 602 are related to content format type information 604 and the content identifier 606 for each piece of digital content. Additionally, a cost amount 608 may also be related to the content objects 602. The cost amount 608 represents the cost or charge for the digital content. If the content is provided free of charge, the cost amount 608 can be set to zero. As an alternative, cost amounts 608 could be related to either the content identifiers 606 or the content objects 602 and stored in a separate database.

Returning again to FIG. 4, it is seen that the content storage database 410 is in communication with the service provider platform 406 through a service provider platform-content storage database communication link 418. It should be noted that the system could have multiple content storage databases connected to the service provider. Further, such content storage databases could be connected to the service provider by multiple types and forms of communication links, any functional equivalent of which should be understood as being within the spirit and scope of the claimed invention. For instance, such content storage databases could be contained on the servers of multiple different content providers and accessed over the World Wide Web. Alternatively, the content storage database, or databases, could be integrated with the service provider platform and communicate over an internal bus or equivalent data communication structure.

Figure 7:
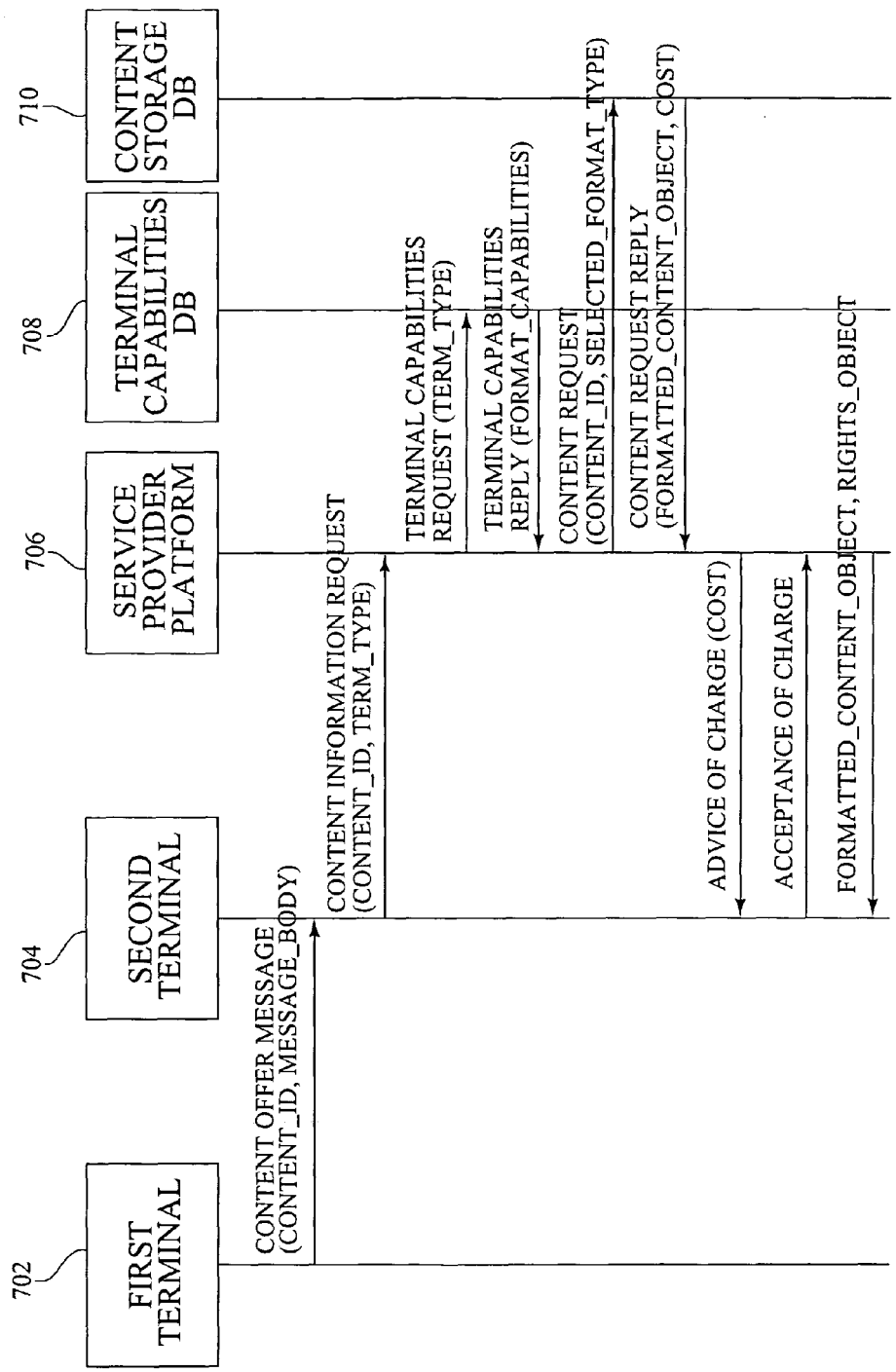
FIG. 7 is a call flow diagram of an exemplary method according to the invention.

In an exemplary method, as shown in FIG. 7, a first terminal 702 sends a content offer message to a second terminal 704. Rather than sending the actual content object to the second terminal 704, the content offer message uses a unique content identifier (CONTENT_ID) to identify the content. For instance, the content identifier could be the first five letters of a musician's name, plus the first five letters of a song, or any other scheme for assigning a unique identifier to the content. Preferably, the content identifier will contain enough information to provide an adequate description of the digital content to the user of the second terminal 704. At a minimum, the content identifier serves as a reference pointer which has all of the information needed to identify the content that the user of the first terminal 702 wishes to forward to the second terminal 704. A first user agent software application running on the first terminal 702 displays the option of forwarding the selected content, such that it appears as if the user of the first terminal 702 is actually forwarding the content. However, the user agent application is actually sending the content offer message to the second terminal 704, identifying the content by the unique content identifier. Thus, the user of the first terminal 702 does not need to be concerned about the format of the content object or the capabilities of the second terminal 704. All rights-protected digital content objects will contain a unique content identifier for this purpose. Preferably, the unique content identifier will be contained in a field or a parameter included with the content object. A second user agent software application running on the second terminal 704 displays the information contained in the content offer message for the user of the second terminal 704, and provides a means of indicating that they would like to "install" the content.

The first user agent application running on the first terminal 702 may also provide the ability for the user of the first terminal to include a message (MESSAGE_BODY) to the user of the second terminal. In such a case, the content offer message would also include the message.

Should the user of the second terminal 704 indicate that they would like to "continue" with the process, the service provider platform 706 will receive a content information request from the second terminal 704. The content information request is a request from the second user agent application running on the second terminal 704, indicating that the user of the second terminal 704 would like to "continue" with the process. The content information request contains the content identifier (CONTENT_ID) and a terminal type identifier (TERM_TYPE) for the second terminal 704. The terminal type identifier serves to identify the terminal type, such as by manufacturer and model number.

In the following step, the service provider platform 706 issues a terminal capabilities request in order to request format capabilities information from the terminal capabilities database 708 using the terminal type identifier for the second terminal 704. The service provider platform 706 will then receive a terminal capabilities reply 728 containing format capabilities information (FORMAT_CAPABILITIES) for the second terminal 704 from the terminal capabilities database 708. The format capabilities information includes information such as the terminal's operating system, supported audio encoder formats, supported video encoder formats, and display information such as the display size and resolution.

Using the format capabilities information for the second terminal 704, the service provider platform 706 can then select a compatible format type for the content, or a preferred format type is there is more than one compatible format type.

Subsequently, using the content identifier and the selected format type (SELECTED_FORMAT_TYPE), the service provider platform 706 can issue a content request command in order to request a content object in the selected format type from the content storage database 710. The content storage database 710 will respond with a content request reply containing the content object in the selected format type (FORMATTED_CONTENT_OBJECT).

Additionally, the content request reply may contain a cost amount (COST), which indicates the amount to be charged for the digital content (or, rather, the rights to use the digital content, which includes the digital content object and the associated rights object). The cost amount would then be communicated to the second terminal 704 in an advice of charge command. The second user agent application would then display the cost information for the user of the second terminal 704. Should the user of the second terminal 704 indicate that they accept the cost; the second user agent application would then send an acceptance of charge command to the service provider platform 706.

Then, the service provider platform 706 can deliver the content object in the selected format type and a rights object to the second terminal 704. It should be noted that the manner in which the service provider platform 706 obtains the rights object is known in the art and is outside the scope of the subject invention. Thus, it appears to the user of the second terminal 704 that they are actually installing content from the first terminal 702. The content object actually received, however, will be in a preferred format type for the second terminal 704. Further, the user of the second terminal 704 does not need to be concerned about the format of the content object or the capabilities of the second terminal 704.

For example, the user of the first terminal 702 forwards the latest Britney Spears song in MP3 format to the user of the second terminal 704. However, the second terminal 704 does not support the MP3 format, but does support the AAC music playback format, instead. The user of the second terminal 704 will be asked if they would like to purchase and install the song. If they agree, the service provider platform 706 will select the preferred format for the second terminal 704, and will send an AAC version of the song.

The system, including the described elements thereof, and the various database elements could be implemented on digital computing equipment, or the equivalent, through the use of computer programs, or the equivalent. Additionally, the various method aspects of the invention may also be found as executable instructions contained on a computer readable medium.

Thus, the invention provides a method and system for smart super-distribution of rights-protected digital content. One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A system for super-distribution of rights-protected digital content, said system comprising;
    a first wireless communication terminal having a first user agent application for sending a content offer message corresponding to a content present on said first wireless communication terminal, said content being rights-protected digital content, said content offer message having a content identifier to identify said content and a user defined message body;
    a second wireless communication terminal in communication with said first wireless communication terminal, said second wireless communication terminal having a second user agent application for receiving said content offer message from said first wireless communication terminal, the second user agent application further enabling a user of the second wireless communication terminal to accept the content offer message, wherein accepting the content offer message generates a content information request to download the content;
    a service provider platform in communication with said second wireless communication terminal, said service provider platform for:
        receiving the content information request for downloading said content from said second wireless communication terminal, said content information request containing a terminal type identifier for said second wireless communication terminal;
        issuing a terminal capabilities request using said terminal type identifier;
        receiving a terminal capabilities reply including format capabilities information;
        selecting a format type for said content using said format capabilities information; and
        delivering to said second wireless communication terminal:
            a content object in said selected format type; and
            a rights object for said content object, the rights object enabling decryption of the content object and unable to be forwarded between terminals;
    a terminal capabilities database relating terminal type identifiers with format capabilities information for:
        receiving a terminal capabilities request including said terminal type identifier from said service provider platform; and
        sending a terminal capabilities reply including said format capabilities information to said service provider platform, the format capabilities information including a display size; and
    a content storage database relating digital content objects with content identifiers and format types, said content storage database in communication with said service provider platform, wherein said service provider platform is further for obtaining said content object in said selected format type from said content storage database using said content identifier and said selected format type wherein said content storage database further relates cost amounts with said content objects, wherein said service provider platform is further for:
  obtaining said cost amount with said content object;
  advising said second wireless communications terminal of said cost amount for said content object; and
  receiving acceptance of said cost amount from said second wireless communications terminal, and
wherein said rights object for said content object is issued to the second wireless communications terminal in response to receiving acceptance of said cost amount from said second wireless communications terminal.

2. A method of distribution of rights-protected digital content where the digital content is offered from a first wireless communications terminal to a second wireless communications terminal using a unique content identifier to identify the content, said method comprising:
  receiving a content information request for said digital content from said second wireless communication terminal, said content information request containing the unique content identifier and a terminal type identifier for said second wireless communication terminal, wherein the unique content identifier corresponds to digital content present on said first wireless communication terminal, and wherein the content information request is generated in response to a user accepting a content offer message received at the second wireless communication terminal from the first wireless communication terminal;
  issuing a terminal capabilities request using said terminal type identifier to a terminal capabilities database;
  receiving a terminal capabilities reply including format capabilities information from said terminal capabilities database, the format capabilities information including a display size;
  selecting a preferred format type for said content using said format capabilities information;
  obtaining said content object in said preferred format type from a content storage database using said content identifier and said selected format type;
  obtaining a cost amount for said content object from said content storage database;
  advising said second terminal of said cost amount for said content object;
  receiving acceptance of said cost amount from said second wireless communications terminal; and
  delivering to said second wireless communication terminal: a content object in said selected format type; and
  a rights object for said content, the rights object enabling decryption of the content object and unable to be forwarded between terminals; wherein said rights object for said content object is issued to the second wireless communications terminal in response to receiving acceptance of said cost amount from said second wireless communications terminal, and wherein said terminal capabilities database relates terminal type identifiers with format capabilities information.

3. A computer readable, non-transitory storage medium having computer executable instructions for performing a method of distribution of rights-protected digital content where the digital content is offered from a first wireless communications terminal to a second wireless communications terminal using a unique content identifier to identify the content, where said method comprises:
  receiving a content information request for said digital content from said second wireless communication terminal, said content information request containing the unique content identifier and a terminal type identifier for said second wireless communication terminal, wherein the unique content identifier corresponds to digital content present on said first wireless communication terminal, and wherein the content information request is generated in response to a user accepting a content offer message received at the second wireless communication terminal from the first wireless communication terminal;
  issuing a terminal capabilities request using said terminal type identifier to a terminal capabilities database;
  receiving a terminal capabilities reply including format capabilities information from said terminal capabilities database, the format capabilities information including a display size;
  selecting a preferred format type for said content using said format capabilities information;
  obtaining said content object in said preferred format type from a content storage database using said content identifier and said selected format type;
  obtaining a cost amount for said content object from said content storage database;
  advising said second terminal of said cost amount for said content object;
  receiving acceptance of said cost amount from said second wireless communications terminal; and
  delivering to said second wireless communications terminal: a content object in said selected format type; and
  a rights object for said content, the rights object enabling decryption of the content object and unable to be forwarded between terminals; wherein said rights object for said content object is issued to the second wireless communications terminal in response to receiving acceptance of said cost amount from said second wireless communications terminal, and wherein said terminal capabilities database relates terminal type identifiers with format capabilities information.

* * * * *